United States Patent
Stol et al.

(10) Patent No.: US 7,198,189 B2
(45) Date of Patent: *Apr. 3, 2007

(54) MULTI-SHOULDERED FIXED BOBBIN TOOLS FOR SIMULTANEOUS FRICTION STIR WELDING OF MULTIPLE PARALLEL WALLS BETWEEN PARTS

(75) Inventors: Israel Stol, Pittsburgh, PA (US); John W. Cobes, Lower Burrell, PA (US)

(73) Assignee: Alcoa Inc., Pittsburgh, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/235,584

(22) Filed: Sep. 26, 2005

(65) Prior Publication Data

US 2006/0065694 A1  Mar. 30, 2006

Related U.S. Application Data

(60) Provisional application No. 60/613,925, filed on Sep. 28, 2004.

(51) Int. Cl.
*B23K 20/12* (2006.01)
*B23K 37/00* (2006.01)
*B23K 5/20* (2006.01)

(52) U.S. Cl. .................... 228/2.1; 228/112.1
(58) Field of Classification Search ............ None
See application file for complete search history.

(56) References Cited

U.S. PATENT DOCUMENTS

| 5,460,317 | A | 10/1995 | Thomas et al. | |
|---|---|---|---|---|
| 6,029,879 | A | 2/2000 | Cocks | |
| 6,273,323 | B1* | 8/2001 | Ezumi et al. | 228/112.1 |
| 6,516,992 | B1 | 2/2003 | Colligan | |
| 6,648,206 | B2 | 11/2003 | Nelson et al. | |
| 6,676,004 | B1 | 1/2004 | Trapp et al. | |
| 6,706,130 | B1* | 3/2004 | Minamitani et al. | 156/64 |
| 6,758,382 | B1* | 7/2004 | Carter | 228/2.1 |
| 6,779,704 | B2* | 8/2004 | Nelson et al. | 228/112.1 |
| 6,908,690 | B2* | 6/2005 | Waldron et al. | 428/615 |
| 2003/0209588 | A1* | 11/2003 | Colligan | 228/112.1 |
| 2005/0139640 | A1* | 6/2005 | Kay | 228/112.1 |
| 2005/0252947 | A1* | 11/2005 | Fujii et al. | 228/112.1 |
| 2006/0043151 | A1* | 3/2006 | Stol et al. | 228/2.1 |
| 2006/0043152 | A1* | 3/2006 | Stol et al. | 228/2.1 |
| 2006/0049232 | A1* | 3/2006 | Murakami | 228/2.1 |

FOREIGN PATENT DOCUMENTS

JP       2002160077 A    *  6/2002

* cited by examiner

*Primary Examiner*—Lynne R. Edmondson
(74) *Attorney, Agent, or Firm*—Greenberg Traurig LLP; Peter J. Borghetti

(57) ABSTRACT

A tool for making simultaneously a plurality of parallel friction stir welds includes at least one shank for holding in a chuck or collet of a friction stir welding machine, a plurality of friction stir welding pins, and friction stir welding shoulders including at least four working surfaces adjacent said pins, the shoulders and pins mounted in axial relationship; dimensions of said friction stir welding pins and shanks corresponding to dimensions and spacings of said friction stir welds.

21 Claims, 19 Drawing Sheets

MULTI-SHOULDERED FIXED BOBBIN TOOLS FOR SIMULTANEOUS FRICTION STIR WELDING OF MULTIPLE PARALLEL WALLS BETWEEN PARTS

CROSS REFERENCE TO RELATED APPLICATIONS

This application claims the benefit of U.S. Provisional Application Ser. No. 60/613,925 filed on Sep. 28, 2004, which has the same title as the present application. It is also closely related to the U.S. application entitled "Advanced Friction Stir Welding Tools", application Ser. No. 11/100,878 Filed on Apr. 7, 2005 and the application entitled "Fracture Resistant Friction Stir Welding Tools", application Ser. No. 11/133,083 filed on May 19, 2005. The teachings of these applications are incorporated herein by reference thereto. These applications have the same inventors and the same assignee as the present application.

FIELD OF THE INVENTION

The present invention relates to friction stir welding and, more particularly, the present invention relates to simultaneous friction stir welding of a plurality of parallel joints between components having parallel portions.

BACKGROUND OF THE INVENTION

The Friction Stir Welding (FSW) process is a solid-state based joining process, which makes it possible to weld a wide variety of materials alloys (Aluminum, Copper, Stainless Steel, etc.) to themselves and combinations (e.g. 6xxx/5xxx, 2xxx/7xxx, etc.). The joining is affected by a rotating FSW tool, which is forced into the joining area to heat it by friction and thus "plasticizes" the parts about it. Plasticized material flows around the axis of the rotating FSW tool, and the plasticized regions coalesce into sound metallurgical bonds. The process can be implemented with conventional FSW tools each consisting of a single pin and shoulder that requires backup with an anvil during welding. FIG. 1 illustrates a prior art friction stir welding tool 10 having a shank 18 that may be held in a chuck or collet of an FSW machine. Shank 18 may have a flat 19 to facilitate the application of torque to FSW tool 10.

FSW tool 10 also includes a pin 12 and shoulder 14 having a workpiece engaging surface 16. Pin 12 may include a thread 13 and flats 15. FSW tool 10 is rotated in the direction which causes thread 13 on pin 12 to push plasticized material toward the tip of pin 12. Workpiece engaging surface 16 of shoulder 14 may include a spiral thread 17. The pitch of spiral thread 17 is such that it tends to move plasticized material inwardly, toward the base of pin 12, when FSW tool 10 is rotated in the direction which tends to push plasticized material toward the tip of pin 12.

FIG. 2 illustrates two plates 111 being butt welded to each other by FSW tool 10. A backup anvil 11 on the back side of plates 111 is necessary to counteract the forging force exerted by the FSW tool onto the plasticized joint and prevent escape of plasticized material, and produce a smooth surface on the back side. Hence, FSW tools similar to FSW tool 10 have the limitation that they cannot be employed for welds for which it is not possible to access the back side of the components being welded.

In order to weld components wherein it is not possible to access the back side of the weld to place a backup anvil, bobbin-type tools may be employed. Such tools include two shoulders and a pin between them. The concept for such tools was patented by Kevin Colligan on 2003 Dec. 30, U.S. Pat. No. 6,660,075 (FIG. 3). The bobbin-type FSW tool 20 illustrated in FIG. 3 includes a FSW pin 21 and a pair of shoulders 22, shoulders 22 including workpiece engaging surfaces 23. Since the shoulders 22 have the taper angle 24, they can be integral with pin 21. In order to impart the forging force to weld workpieces 111 having some tolerance in thickness, the workpiece engaging surfaces 23 are tapered away from workpieces 111 at the taper angle 24 shown in FIG. 3.

Not only does the taper angle 24 enable workpieces having somewhat variable thicknesses to be welded, it also ensures that the necessary forging force is applied to the plasticized region whereby plasticized material is confined to the weld region, and smooth surfaces are produced on the upper and lower surfaces of the weld. The teachings of U.S. Pat. No. 6,660,075 are included herein by reference thereto.

A more complete drawing of a bobbin-type FSW tool is given in FIG. 4. Bobbin-type FSW tool 30 includes a shank 36 and an FSW pin 39. Pin 39 includes a proximal pin portion 31 on the proximal side of the center 38 of pin 39, and a distal pin portion 37 on the distal side of the center 38 of pin 39. Proximal pin portion 31 and distal pin portion 37 have opposite pitch, and FSW tool 30 is rotated in the direction which tends to cause plasticized material to flow towards the center 38 of pin 39.

FSW tool 30 also includes a proximal shoulder 32 having workpiece engaging surface 33 and distal shoulder 34 having workpiece engaging surface 35. Again, the workpiece engaging surfaces 33 and 35 are tapered to tolerate variations in workpiece thickness and to apply the required forging force to the plasticized material. The bobbin-type FSW tool 30 is described in the copending patent application entitled "Advanced Friction Stir Welding Tools", application Ser. No. 11/100,878 Filed on Apr. 7, 2005.

FSW tool 30 includes a tension member 27, which is placed in tension by nut 28 acting through spring washer 29. The purpose of tension member 27 is to place pin 39 in compression to prevent fracture of pin 39 due to the combination of severe cyclic torsion and bending moments it experiences during friction stir welding.

FIG. 5 illustrates the bobbin type FSW tool 30 in position for welding joint 113, which is one of a pair of joints 113 and 114 needed to produce a rectangular tube from a pair of elongate members, each elongate member having a cross-section shaped like a square bracket, each elongate member corresponding to one half of the cross-section of the rectangular tube. It is noted that bobbin tools of the type taught by Mr. Colligan are capable of welding only one joint at a time.

FIG. 6 illustrates a prior art FSW tool 50 having superior mechanical properties. It includes an integral shank-pin ensemble with a shoulder 54 threaded onto the shank-pin ensemble. FSW tool 50, preferably, has a close fit 57 between the shank 53 and the inside of the shoulder 54. It also has a close fit 58 between the pin 52 and the inside of shoulder 54 near the base of pin 52, and it has a firm stop 59 between the inside of shoulder 54 and the shank 53. FSW tool 50 is presented in the copending patent application: "Advanced Friction Stir Welding Tools", application Ser. No. 11/100,878 Filed on Apr. 7, 2005.

That application also advances the concept of including an internal tension member to provide compression loading of the pin of a bobbin type FSW tool. FIG. 7 provides preferred internal detail regarding the prior art bobbin-type FSW tool. Preferably, FSW tool 30 includes a snug fit 42 at the proximal end of proximal shoulder 32, snug fit 41 at the distal end of proximal shoulder 32, and firm stop 42. Likewise, FSW tool 30 includes snug fit 44 at the proximal end of distal shoulder 34, and the firm stop 45. Both shoulder 32 and shoulder 34 may be assembled by threading them on from the distal end of FSW tool 30.

While the FSW tools described above have a number of desirable features, each is capable of welding only one joint at a time. A need remains for a FSW tool which can make a plurality of welds such as joint 113 and 114 shown in FIG. 5.

SUMMARY OF THE INVENTION

In one aspect, the present invention is a friction stir welding tool for simultaneously making a plurality of parallel welds. The friction stir welding tool includes a plurality of friction stir welding modules, each of the friction stir welding modules including at least one friction stir welding pin, and a pair of workpiece engaging surfaces facing the at least one friction stir welding pin. Each of the workpiece engaging surfaces is disposed on a shoulder attached to or integral with the at least one friction stir welding pin, whereby the shoulders and pin(s) rotate in unison. The friction stir welding modules are connected to each other or integrally formed whereby the modules rotate in unison. At least one shank is attached to or integral with at least one of the friction stir welding modules, whereby the shank and the modules rotate in unison. The at least one shank is for engagement with a chuck or collet of a friction stir welding machine to be rotated thereby.

In another aspect, the present invention is a method of making a plurality of parallel friction stir welds simultaneously to join a pair of workpieces. The method comprises placing the workpieces in juxtaposition, moving the workpieces through a FSW machine, the FSW machine having a FSW tool having a plurality of welding modules, whereby the plurality of FSW welds are produced by the FSW tool.

In another aspect, the present invention is a weldment comprising two or more parallel friction stir welds made in a single pass.

NOMENCLATURE

Figure 1:
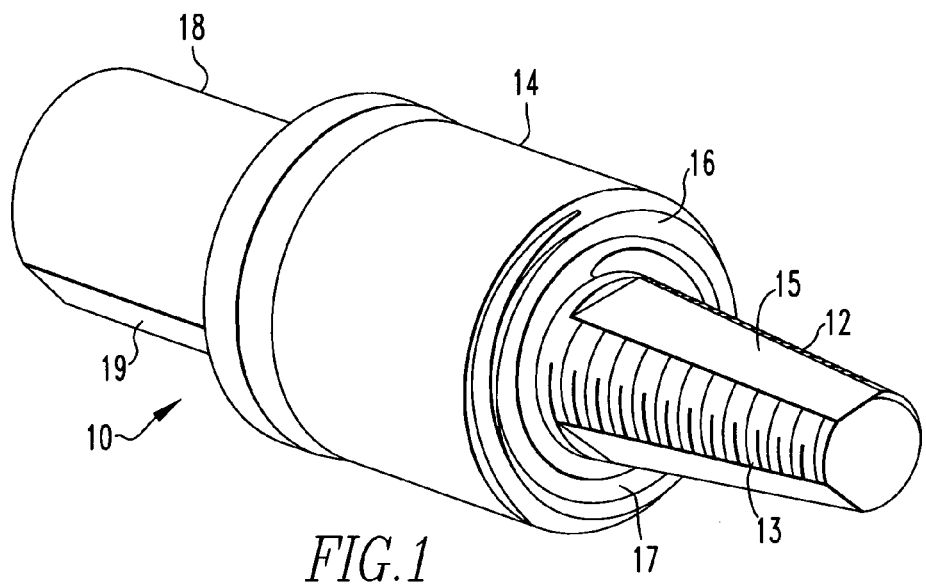
FIG. 1 is a sketch of a prior art friction stir welding tool.
Figure 2:
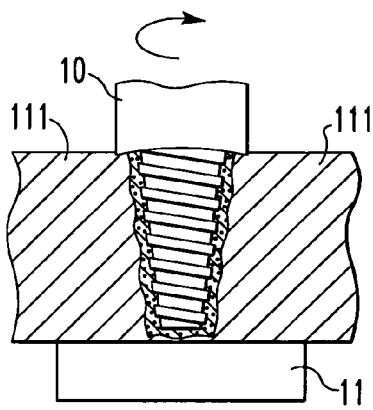
FIG. 2 is a schematic illustration of a prior art friction stir welding tool with a backup anvil.
Figure 3:
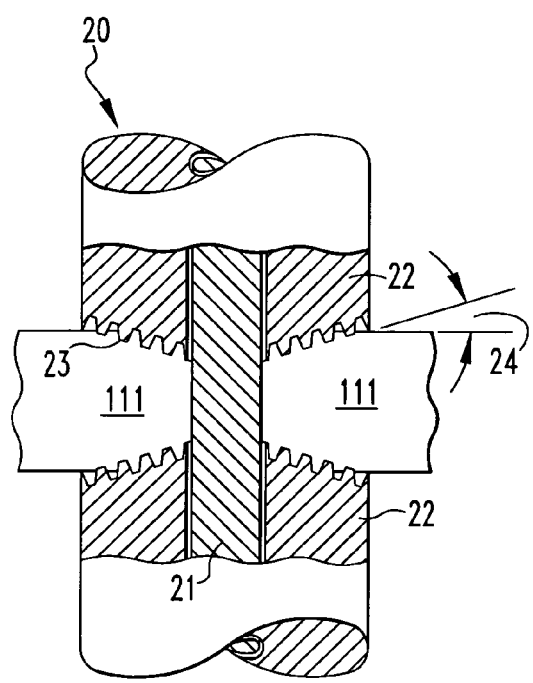
FIG. 3 is a drawing from an issued United States patent for a bobbin type friction stir welding tool.
Figure 4:
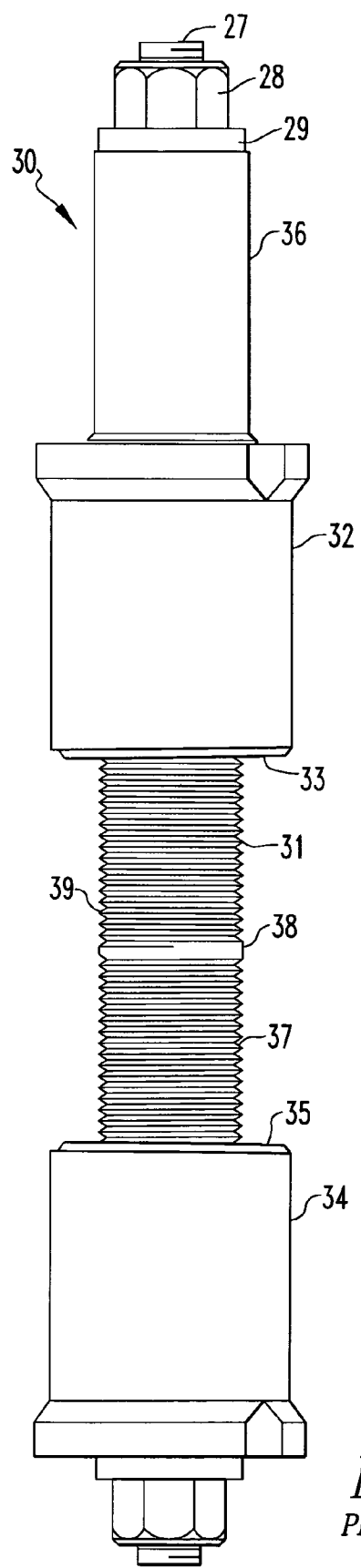
FIG. 4 is an illustration of a prior art bobbin type friction stir welding tool including a tension member for placing the pin in compression.
Figure 5:
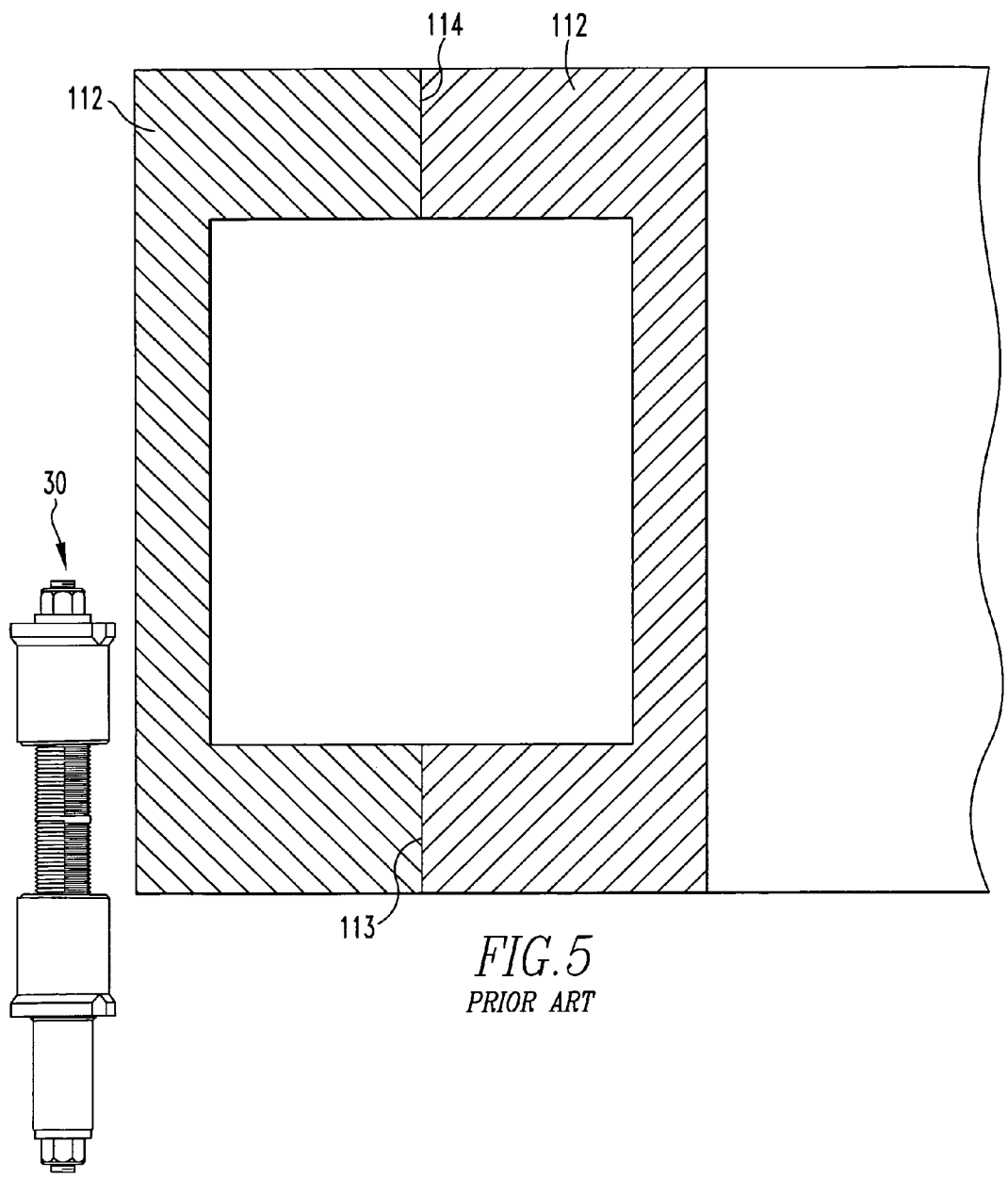
FIG. 5 is an illustraton of a prior art bobbin type friction stir welding tool readied for welding one of a pair of parallel joints.

10 Prior art FSW tool
11 Backup anvil
12 Pin
13 Threads on pin 12
14 Shoulder
15 Flat on Pin
16 Workpiece engaging surface of shoulder
17 Spiral thread on shoulder
18 shank
19 Flat on shank
20 Prior art Fixed bobbin tool
21 Pin of tool 20
22 Shoulder of tool 20
23 Workpiece engaging surface of shoulder 22
24 Taper angle of workpiece engaging surface 23
27 Tension member
28 Nut
29 Spring washer
30 Prior art bobbin tool
31 Proximal pin portion 32 Proximal shoulder
33 Workpiece engaging surface of shoulder 32
34 Distal shoulder
35 Workpiece engaging surface of shoulder 34
36 Shank of FSW tool 30
37 Distal pin portion
38 Center of pin 39
39 Pin
41 Snug fit of proximal shoulder near working face thereof
42 Snug fit of proximal shoulder
43 Firm stop of proximal shoulder
44 Snug fit of distal shoulder
45 Firm stop on distal shoulder
50 Prior art FSW tool having integral pin and shank
52 Pin
53 Shank
54 Shoulder
55 Workpiece engaging surface of shoulder
56 Threaded interface between shank and shoulder
57 Proximal close fit
58 Distal close fit
59 Firm stop
60 FSW tool for simultaneously welding two joints
61 Tension member
62 Nut
63 Spring washer
66 Long shank
67 Right handed shoulder
68 Left handed shoulder
69 Spacer washer
70 Multi-shouldered fixed bobbin tool for FSW 3 points
71 L.H. Pin portion
72 Abutting ends of pins
73 R.H. Pin portion
75 Long shank
76 Tension member
77 Nut
78 Compression washer
82 L.H. Shank
83 Spacer washer
84 R.H. shank
85 Snug fit at proximal end of L.H. shoulder
86 Snug fit at distal end of L.H. shoulder
87 Firm stop on L.H. shoulder
88 Snug fit at distal end of R.H. shoulder
89 Snug fit at proximal end of R.H. shoulder
90 Firm stop on R.H. shoulder
111 Plate being welded
112 C-shaped extrusion
113 Lower joint to be welded
114 Upper joint to be welded
122 E-shaped extrusion
123 Upper joint to be welded
124 Center joint to be welded
125 Lower joint to be welded
130 Machine for welding extrusions
132 Loading conveyor
134 Unloading conveyor
136 FSW motor
138 Upper FSW chuck or collet
140 Lower FSW chuck or collet
142 Grippers
144 Belt
150 Mechanical link arm made by present invention
152 Upper weld
154 Lower weld
156 Angle link arm
157 Upper weld
158 Lower weld
160 Cylindrical structure
162 Weld in cylindrical structure
170 U-shaped member
172 Weld in U-shaped member
180 Deck plate
182 Weld in deck plate
192 Tension member
194 Upper pin
195 Non axisymmetric end of pin 194
196 Lower pin
197 Mating non axisymmetric end of pin 196
202 Threaded tension member
204 Upper pin having internal threads
205 Planar end of pin 204
206 Lower pin having internal threads
207 Planar end of pin 206
210 Bobbin type FSW tool with shoulders which thread on from shank
212 Shank
214 First shoulder
215 Firm stop on first shoulder
216 First pin
217 Proximal portion of pin 216
218 Distal portion of pin 216
219 Second shoulder
222 Third shoulder
224 Firm stop on third shoulder
226 Spacer washer
228 Second pin
230 Integral multi shouldered fixed bobbin type FSW tool
232 Shank
234 Upper shoulder
236 Working face of shoulder
238 Upper pin portion
240 Lower pin portion
242 Working face of shoulder
244 Center shoulder
246 Lower shoulder

DETAILED DESCRIPTION OF PREFERRED EMBODIMENTS

The present invention teaches the concept of multi-shouldered fixed bobbin tools that afford simultaneous friction stir welding of multiple parallel walls between parts. The term "wall" here can mean a sheet, a plate, a flange or web, a planar portion of an extrusion or rolled product, or a planar portion of a casting, etc.

In the discussion which follows, directional terms such as "top", "bottom", "upper", "lower", etc are for reference only. The tools described are for use in any orientation.

Figure 8:
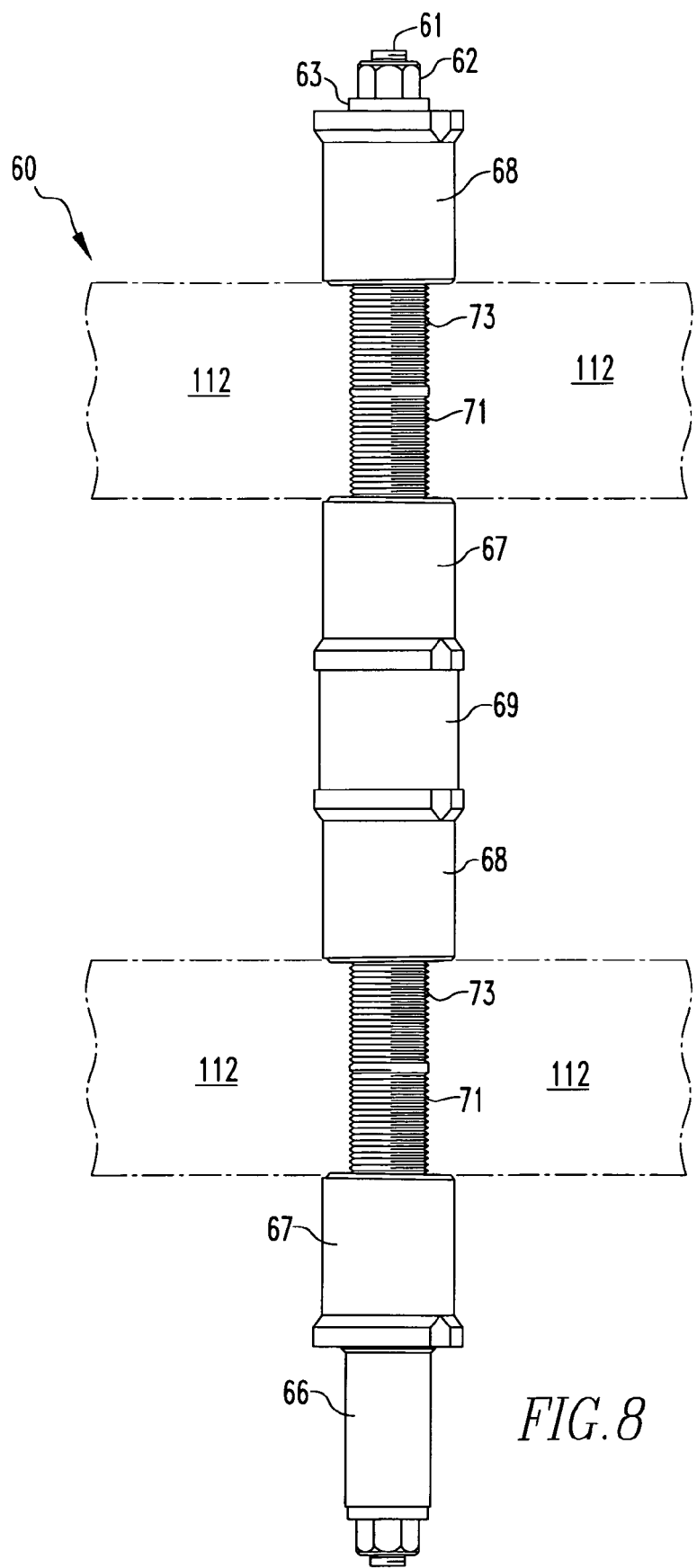
FIG. 8 is a sketch of a multi-shouldered fixed bobbin type friction stir welding tool for welding two parallel joints simultaneously.

FIG. 8 illustrates a multi-shouldered fixed bobbin tool 60, according to the present invention. Bobbin tool 60 is for making two parallel welds simultaneously.

The inventors have realized that in order to FS weld with a multi-shouldered fixed Bobbin tool:
  a) Multiple parallel walls (e.g. 2–4),
  b) Relatively thick walls (2.5 cm), and
  c) Tough/strong alloys (e.g. 7085), the tool must be extra strong to resist the severe bending and twisting at its pins during welding. Fortuitously this realization coincided with a recent invention for Advanced Friction Welding Tools", which was cited above in the Cross Reference to Related Applications.

In order to impart to the proposed multi-shouldered Bobbin tool the required strength to resist the intense cyclic bending and twisting during welding of multiple parallel walls, the present invention advances the concept of combining the use of compression loading of the pins, between the shoulders, with the aid of an internal tension member and also the concept of an integral pin/shank ensemble with a self-locking shoulder threaded onto the pin/shank ensemble.

Figure 21:
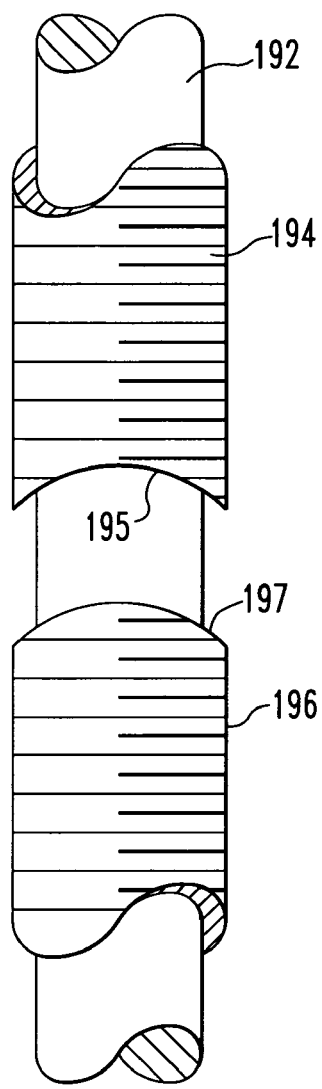
FIG. 21 illustrates optional torque communication features on adjacent pins.

In regard to the Presently preferred embodiments:

a) Each tool will include a threaded tension member (FIG. 8), which runs along the entire length of the tool (i.e. through all pins and shoulders).

b) The proposed tools will be assembled by threading opposing pairs of pin/shanks, with their respective self-locking shoulders already threaded on, and firmly "lightening" them against each other at their abutting noses, to the required level (torque and/or required elongation of the tension member). This will put the opposing pins into compression and the internal threaded rod into tension. During FSW the internal tension member will be "protected" (or "shielded") from excessive flexing by the compressing pins, the near-perfect forced abutment between the noses of the pins and/or use of torque-sharing locks between the abutting noses of the pins (FIG. 21). Torque can also be shared through roughening of the pins' noses and/or other transitional locking parts placed between the noses of the pins. The compression applied to the pins by the tension member makes it possible to employ ceramics or hard, brittle alloys.

c) Once the required number of pin/shanks, with their respective self-locking shoulders have been threaded onto the tension member and tightened against each other, compression will be applied to the pins by tightening one or two tension nuts at the end(s) of the internal tension member (FIG. 8).

d) Because each pair of opposing pins represents a discrete welding area of two abutting or overlapping walls, the total number (e.g. 2–4) of parallel walls to be welded between parts would be accommodated by varying the number of pin-pairs and their corresponding number of shoulders.

e) By varying the length of the pins of each pair, a bobbin tool according to the present invention can be adjusted for welding parallel walls with different thickness.

f) If the distances between different parallel walls (three or more) are not the same, with the proposed multi-shouldered FSW tool these distances are accommodated by adding or removing spacer-washers.

The FSW tool 60 illustrated in FIG. 8 is for producing a pair of parallel welds, for example, one weld between the upper pair of plates 112 and one weld between the lower pair of plates 112. FSW tool 60 includes a long shank 66 which may be held in a chuck or collet of a friction stir welding machine. FSW tool 60 includes two each of shoulders 67 and 68 and two each of pin portions 71 and 73.

In the following discussion, it is presumed that FSW tool 60 is to be rotated clockwise, as seen from the lower end of long shank 66. In that case, both shoulders 67 are right handed shoulders, that is to say, have clockwise internal threads so that friction with workpieces 112 forces the right handed shoulders 67 into firm engagement with the shank-pin ensembles to which they are attached. For example, the lower right hand shoulder 67 is attached to a shank-pin assembly including long shank 66 and the lowest pin 71. The upper right hand shoulder 67 is attached to a shank pin assembly which includes pin portion 71.

Similarly, both of the shoulders 68 are left handed shoulders, that is to say, they have counterclockwise internal threads so that friction with workpieces 112 forces the left handed shoulders 68 into firm engagement with the shank-pin ensembles to which they are attached. These shank-pin ensembles include the pin portions 73.

The threads on pin portions 71 are left handed threads, so that plasticized material is urged toward the juncture of pin portion 71 and pin portion 73 when FSW tool 60 is rotated in a clockwise direction as seen from long shank 66. Likewise, the threads on pin portions 73 are right handed threads so that plasticized material is urged toward the juncture of pin portion 71 and pin portion 73 when FSW tool 60 is so rotated.

An optional spacer washer 69 may be employed to accommodate variable separation between the workpieces 112. The shoulders 67 and 68, the pin portions 73 and 73, and spacer washer 69 are held in compression by tension member 61, which, preferably has threaded ends and is placed in tension by nut 62 acting through a spring washer 63. Spring washer 63 may, for example only, be a Belleville© washer.

Figure 9:
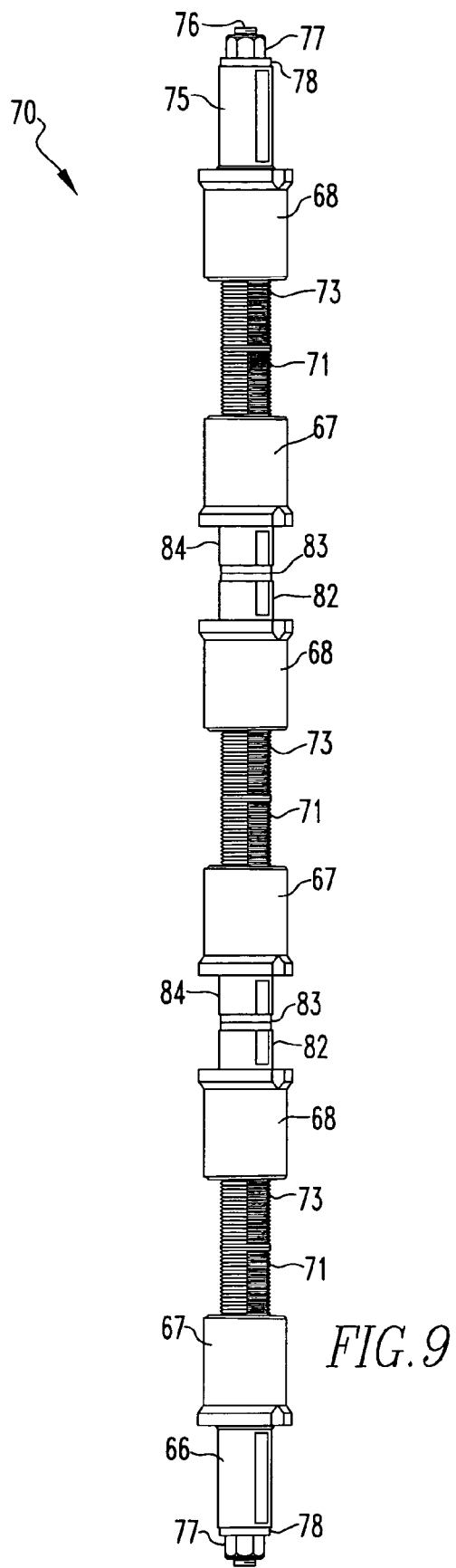
FIG. 9 is a sketch of a multi-shouldered bobbin type friction stir welding tool, according to the present invention, for simultaneously welding three parallel joints.
Figure 10:
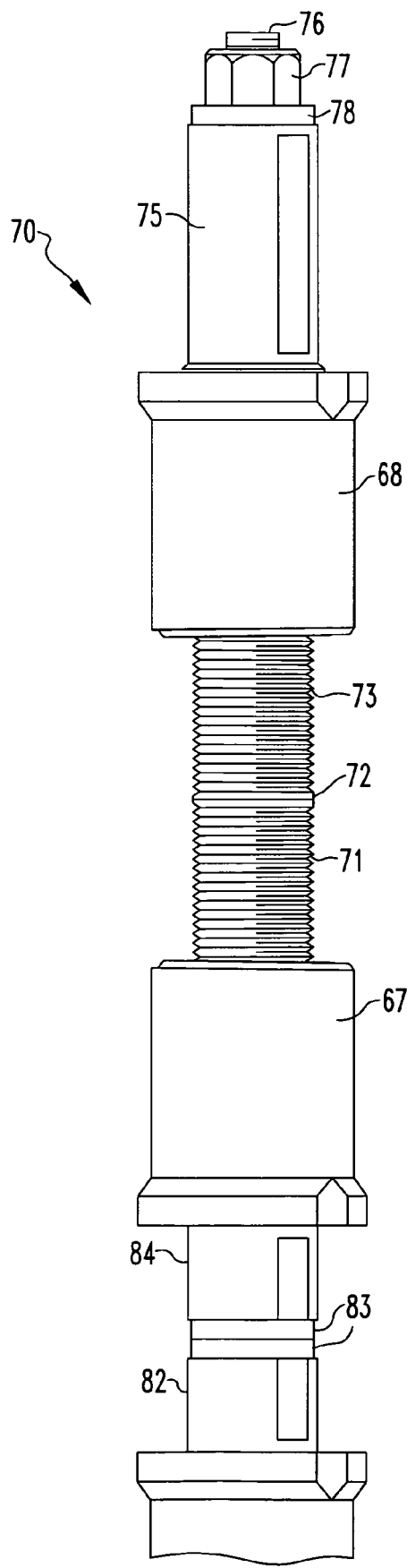
FIG. 10 is a detail of the multi-shouldered bobbin type friction stir welding tool illustrated in FIG. 9.
Figure 11:
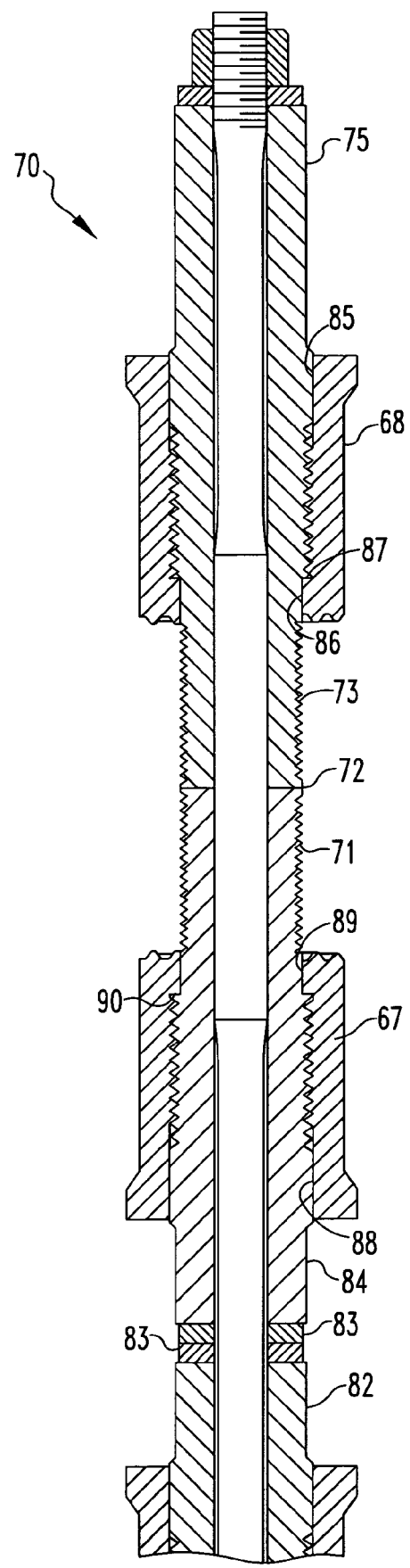
FIG. 11 is an illustration, partly in section, of the multi-shouldered bobbin type friction stir welding tool illustrated in FIG. 9, the shoulders being sectioned to show the self-locking feature.

FIGS. 9, 10 and 11 show a FSW tool 70 which is for making three welds simultaneously. FSW tool 70 includes a long shank 66 which, preferably, is integral with the lowest pin 71. FSW tool 70 is made to be rotated clockwise, as seen from long shank 66. Preferably, each of the three welding units includes a right handed shoulder 67, a left handed shoulder 68, a left handed pin portion 71 and a right handed pin portion 73.

FIGS. 10 and 11 show detail of the abutting pin portions 71 and 73, which meet at abutting junction 72. The purpose of having the abutting junction 72 rather than making the pin portions 71 and 73 integrally is so that the shoulders 67 and 68 can be assembled by passing them over the pin portions 71 and 73, respectively. Preferably, the right handed shoulder 67 shown in FIGS. 10 and 11 is assembled to the shank-pin ensemble comprising pin 71 and right handed shank 84, prior to the final assembly of FSW tool 70. Likewise, the left handed shoulder 68 is assembled to the shank-pin ensemble comprising the long shank 75 and pin 73 shown in FIGS. 10 and 11, prior to the final assembly of FSW tool 70. The thread on pin 71 is left handed and the thread on pin 73 is right handed to cause plasticized material to move toward abutting junction 72 when FSW tool 70 is rotated in a clockwise direction, as seen from the long shank 66 seen in FIG. 9.

Each of the shoulders 67 and 68 are assembled to their respective shank-pin ensembles, before the final assembly of FSW tool 70. FIG. 10 shows a pair of spacer washers 83 which may be placed between the left handed shank 82 and right handed shank 84. Final assembly of FSW tool 70 is accomplished by placing all the components, including the shoulders, each assembled to its corresponding shank-pin ensemble, and any spacer washers required onto the tension member 76, attaching nuts 77 and spring washers 78, and then tightening nuts 77 to provide the appropriate tension on tension member 76, and thus the corresponding compression on pin portions 71 and 73. To ensure torque transmission between shanks 82 and 84 the 83 washers may be designed to lock into each other and to the two shanks.

Preferably, FSW tool 70 is rotated synchronously at both ends, by rotating long shanks 66 and 75. Two electric motors, which are connected electrically, may be employed for this purpose, or one electric motor attached to a chuck or collet for one of the long shanks, and gearing to drive a chuck or collet for the other long shank may be employed.

Figure 12:
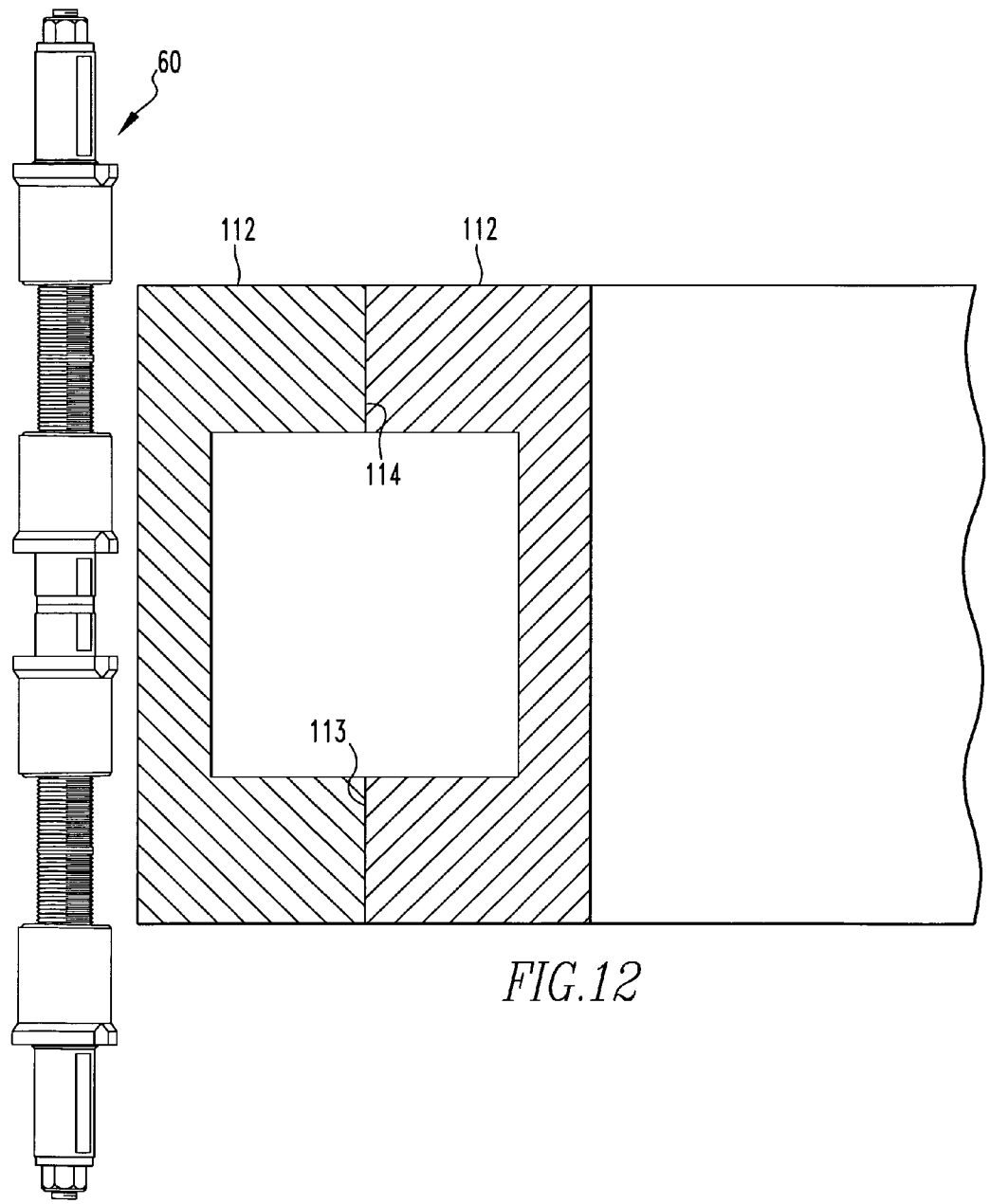
FIG. 12 is a sketch of a FSW tool according to the present invention readied for simultaneous welding of two parallel joints.
Figure 13:
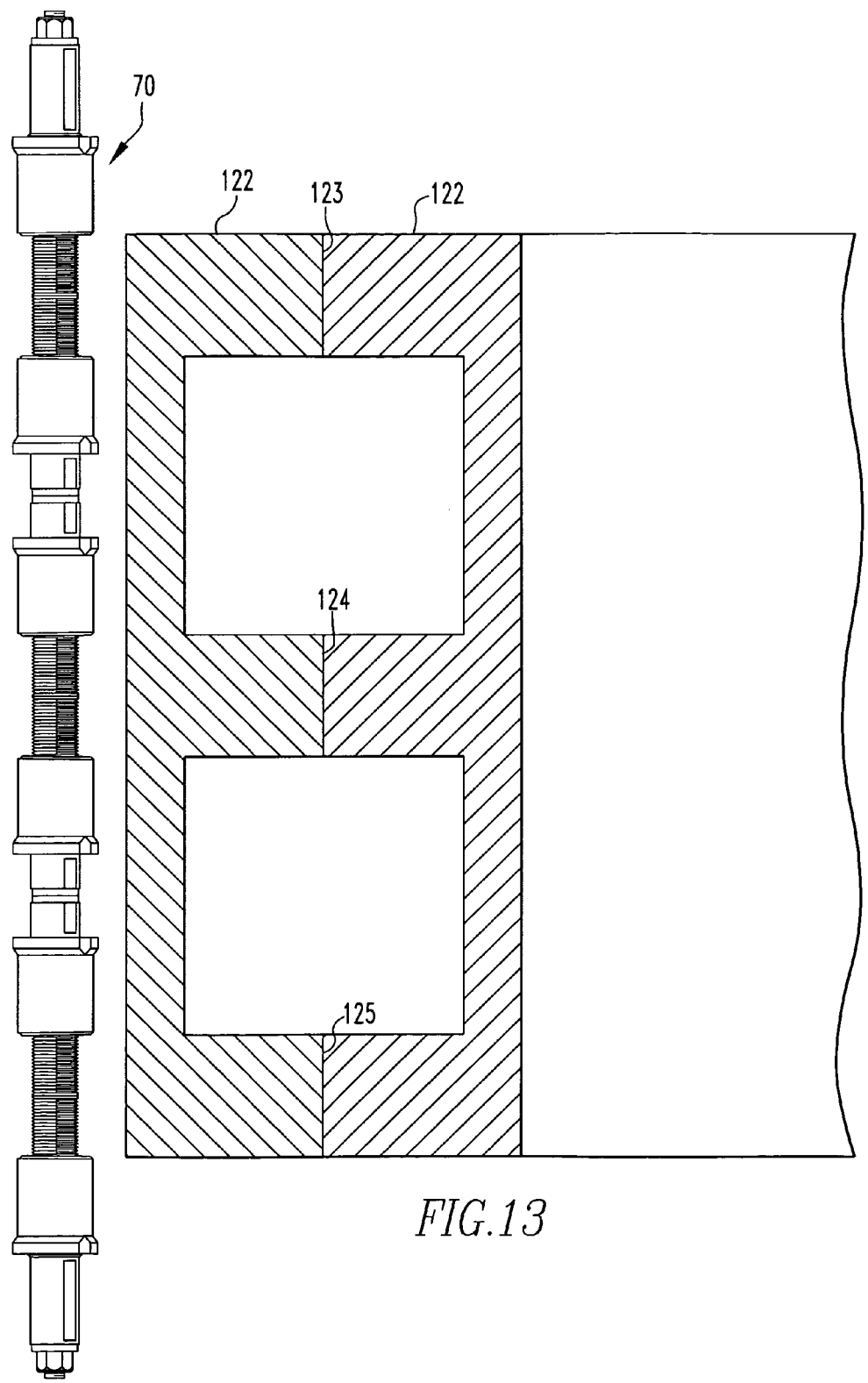
FIG. 13 is a sketch of a FSW tool according to the present invention readied for simultaneous welding of three parallel joints.

FIG. 12 illustrates FSW tool 60, which was shown in FIG. 8, positioned to weld joints 113 and 114 between two extrusions 112. Likewise, FIG. 13 illustrates FSW tool 70, which was illustrated in FIGS. 9, 10 and 11, being employed to simultaneously weld joints 123, 124 and 125 between two extrusions 122.

Figure 14:
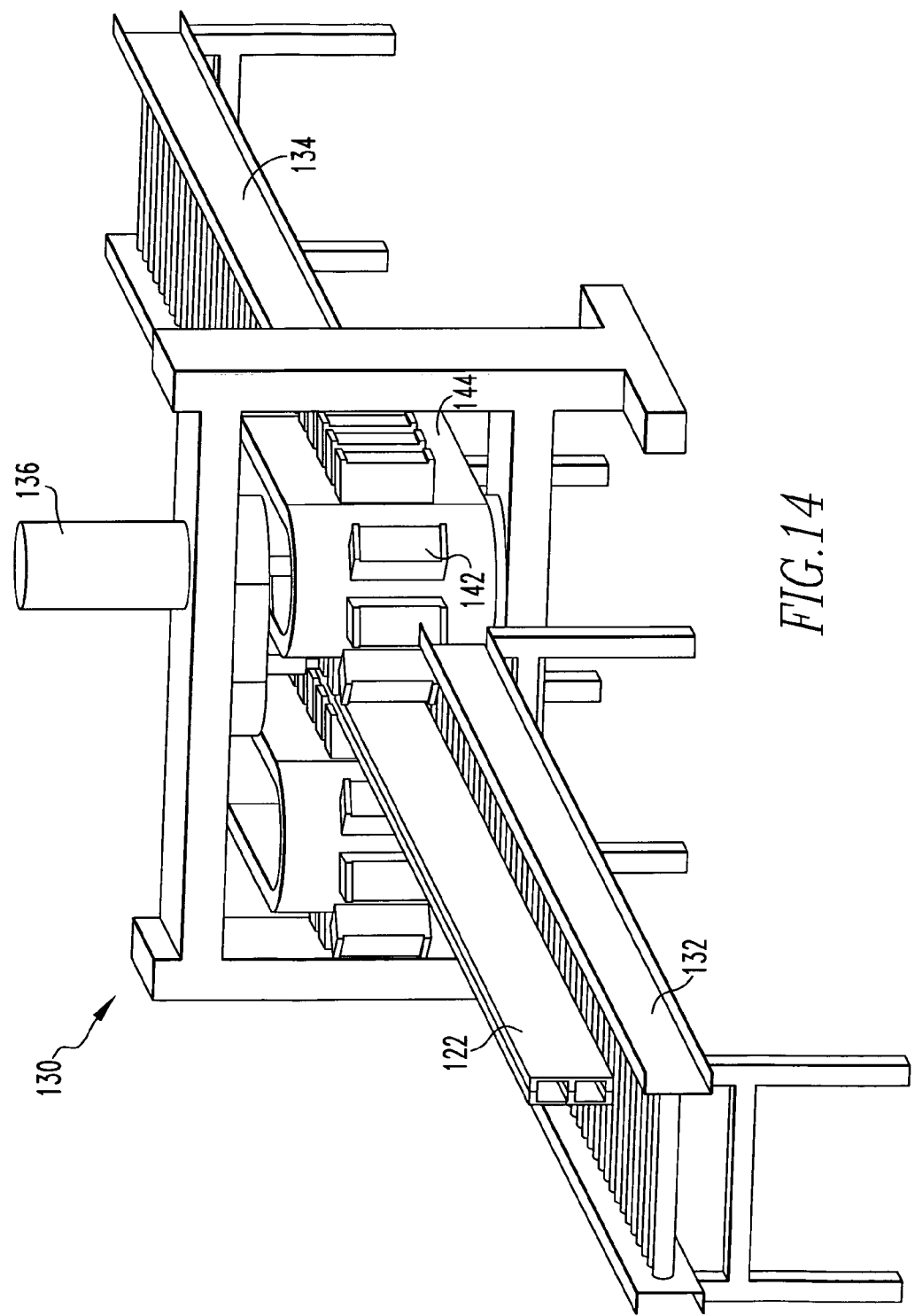
FIG. 14 is an illustration of a system for simultaneous welding of extrusions with multiple parallel walls using a multi-shouldered fixed bobbin tool according to the present invention.
Figure 15:
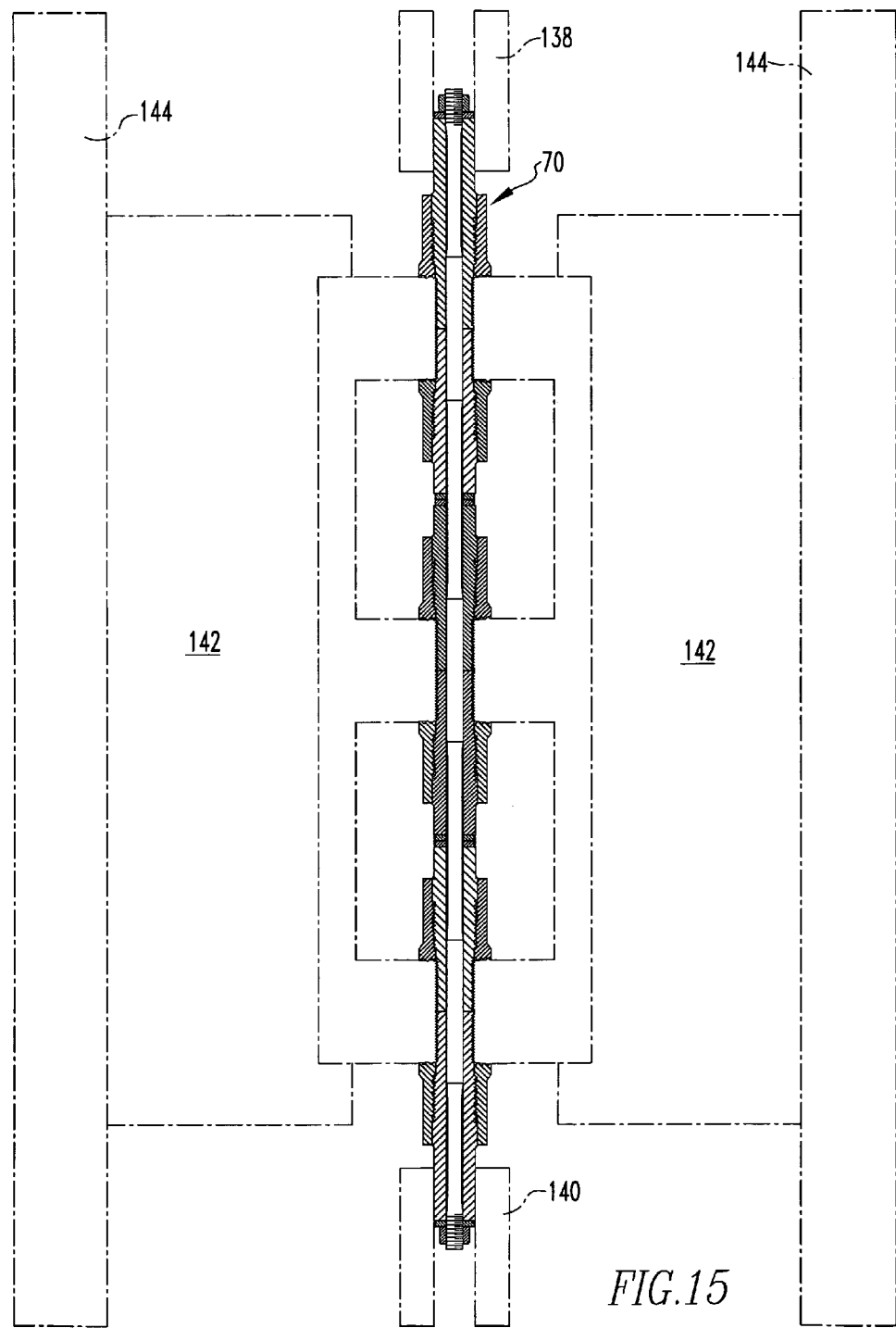
FIG. 15 is a detail showing the extrusions shown in FIG. 14 being welded.

FIG. 14 illustrates a production FSW machine 130 for making a plurality of welds simultaneously, in this case, three welds. FIG. 15 shows a section cut along the axis of FSW tool 70, which is included in FSW machine 130. FIG. 14 illustrates a loading conveyor 132 and an unloading conveyor 134. FIG. 14 also shows a motor 136 which is for rotating the chuck or collet 138 shown in FIG. 15. Preferably the chuck or collet 140 at the lower end of FSW tool 70 is also turned by a second motor which has electrical connection to motor 136, or by shafts and gears driven by motor 136.

Preferably, the workpieces, as for example, the extrusions 122, are held and moved by grippers 142 attached to moving belt 144. A person skilled in the art will recognize that the motive power for belt 144 must be carefully controlled to obtain a preferred velocity for the welding process, and to prevent breaking of FSW tool 70.

Figure 16:
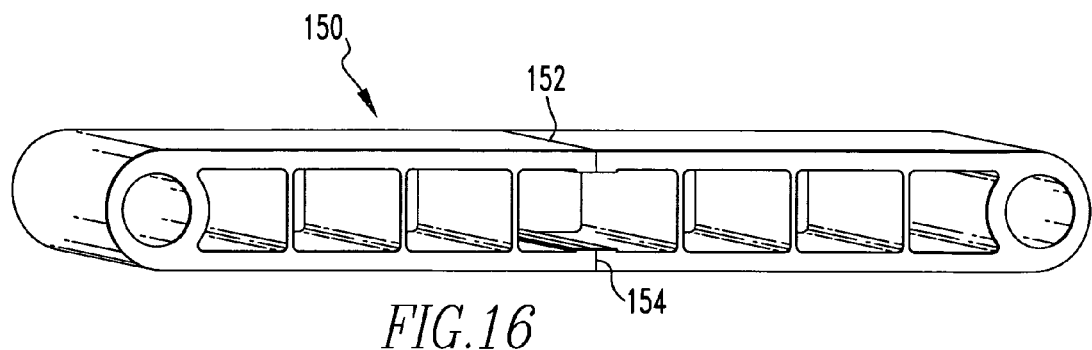
FIG. 16 is a sketch of a mechanical arm having two parallel welds made by the FSW tool of the present invention.

FIG. 16 is an illustration of a link arm having joints 152 and 154, which can be produced in a single pass by a FSW tool such as FSW tool 60, shown in FIG. 8.

Figure 17:
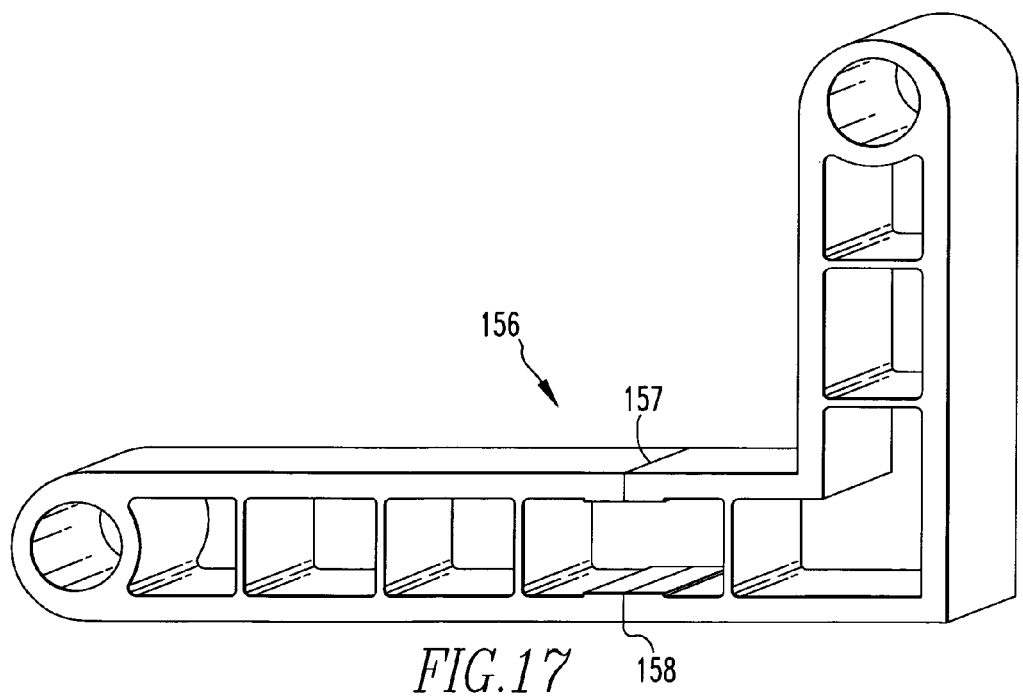
FIG. 17 is a sketch of an angled mechanical link having two parallel welds made by the FSW tool of the present invention.

FIG. 17 illustrates an angle link arm having joints 157 and 158 which can likewise be produced in a single pass by a FSW tool such as FSW tool 60.

Figure 18:
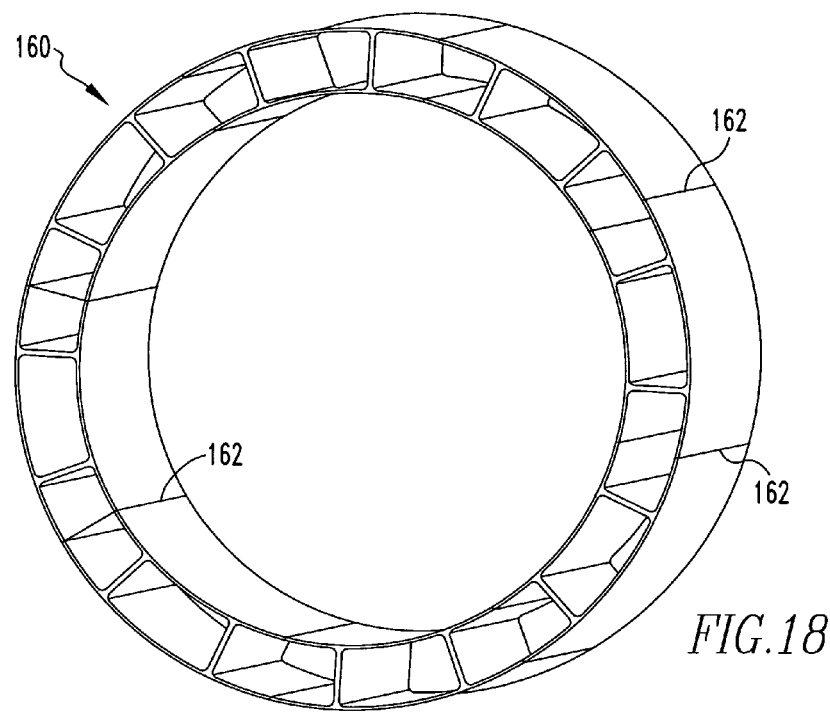
FIG. 18 is an illustration of a coaxial structure having multiple pairs of parallel welds made by the FSW tool of the present invention.

FIG. 18 illustrates a cylindrical double-walled vessel having joints 162, which can be made by repeated passes of a FSW tool such as FSW tool 60.

Figure 19:
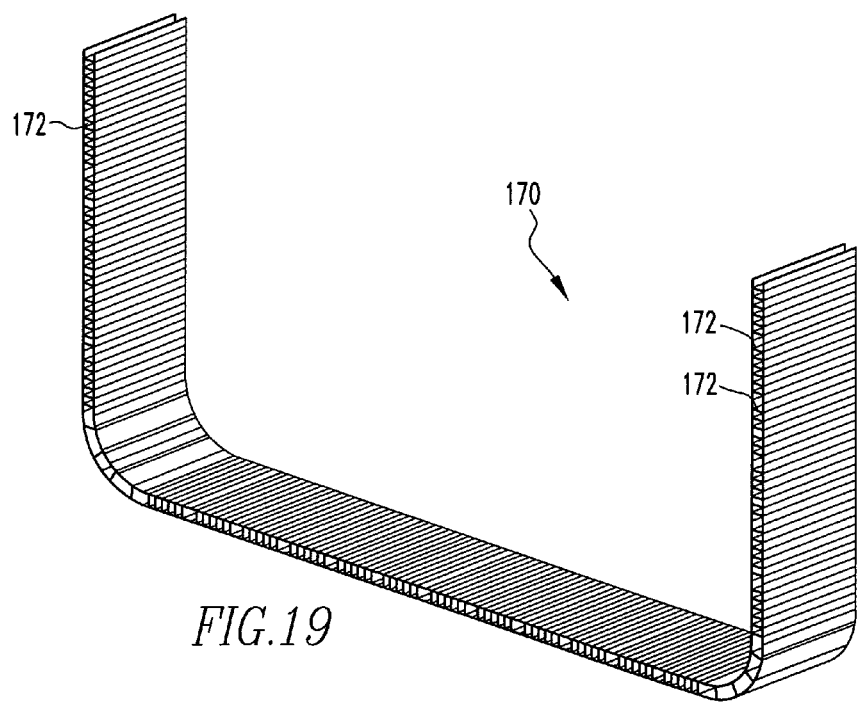
FIG. 19 is an illustration of a double walled structure made by the FSW tool of the present invention.

FIG. 19 illustrates a double walled structure such as a boat hull, vat, tank, etc, having joints 172, which can be made by repeated passes of a FSW tool such as FSW tool 60.

Figure 20:
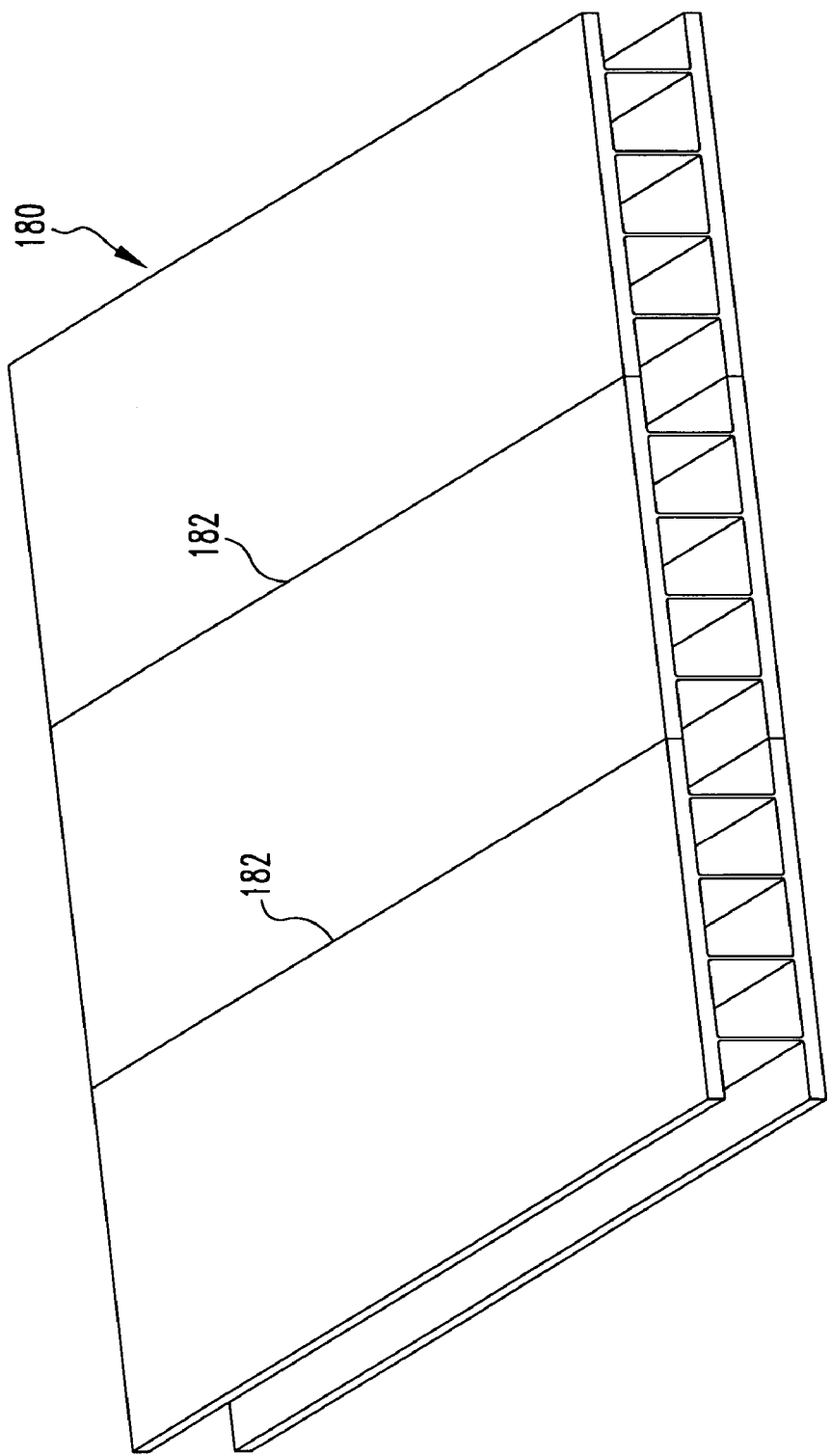
FIG. 20 is an illustration of a multi-width double walled panel made by the FSW tool of the present invention.

FIG. 20 illustrates a multi-width panel having joints 182 which can be made by FSW tool 60.

Figure 22:
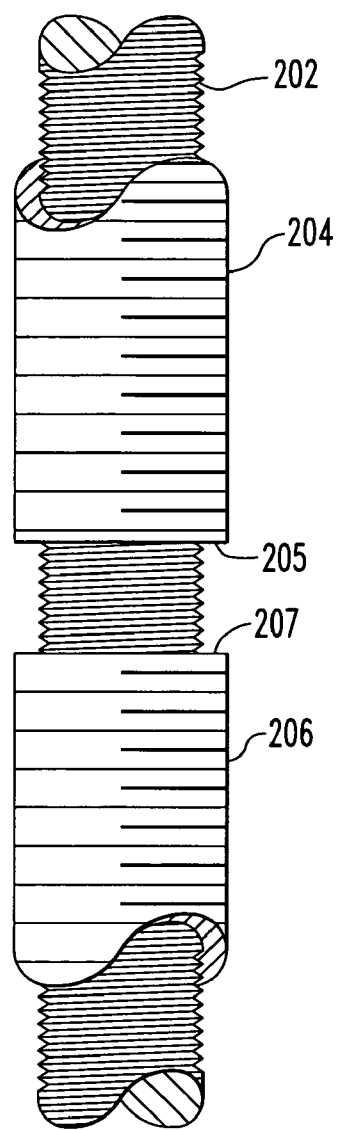
FIG. 22 illustrates a threaded tension member which is an optional aspect of the present invention.

FIGS. 21 and 22 illustrate two approaches to enhancing the ability of adjacent pin portions to communicate the torsion required for friction stir welding. In FIG. 21, a tension member 192 is employed, which, preferably is not threaded, except at the ends to receive tightening means such as nuts 62.

In order for pin portions 194 and 196 to communicate torque between them, pin portion 194 has a non-axisymmetric surface 195, and pin portion 196 has a complimentary non-axisymmetric surface 197. When tension in tension member 192 forces pin portion 194 tightly against pin portion 196, torsion may be communicated between non-axisymmetric surface 195 and non-axisymmetric surface 197. In the configuration shown in FIG. 22, the tension member 202 is threaded, and inside threads are formed in pin portion 204 and 206. The threads on tension member 202 and the inside threads on pin portion 204 and 206 are employed to force the end 205 of pin portion 204 against the end 207 of pin portion 206, so that torsion can be communicated between pin portion 204 and pin portion 206.

Figure 23:
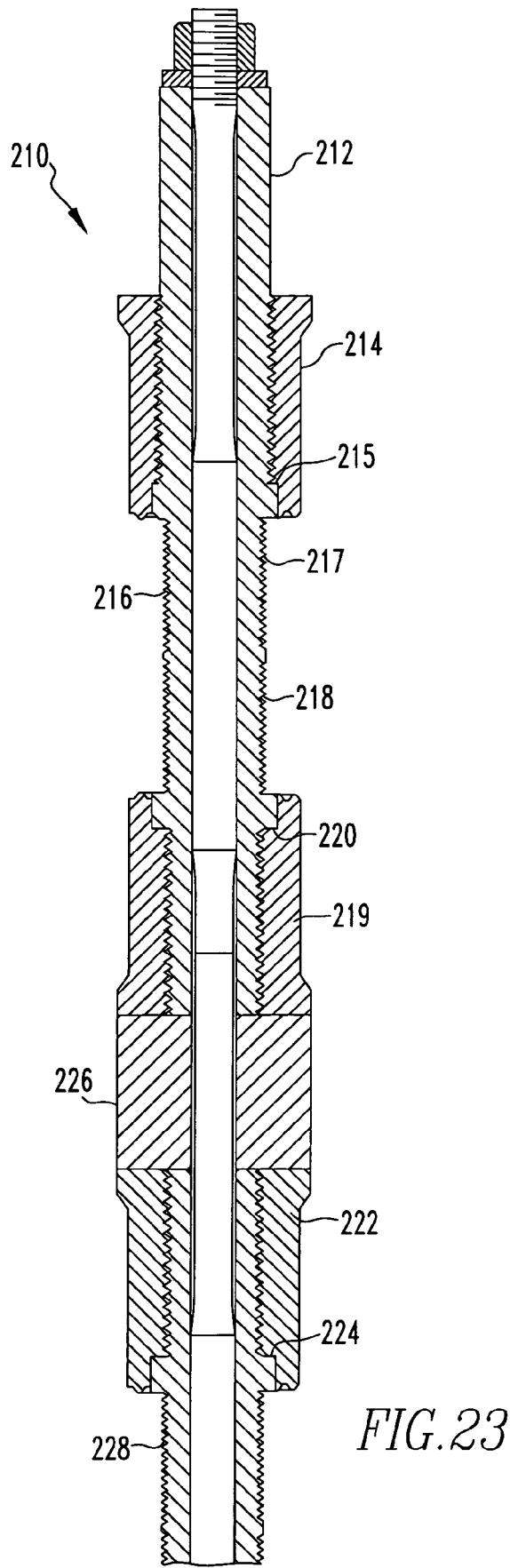
FIG. 23 illustrates a portion of an alternative multi-shouldered fixed bobbin tool having an integral shank-pin ensemble wherein the shoulders are threaded onto the shank-pin ensemble from the shank sides.

FIG. 23 illustrates an alternative embodiment of the present invention. FSW tool 210 includes a pin 216 having pin portions 217 and 218. Pin portions 217 and 218 are integrally formed. There is no abutting junction such as abutting junction 72 between pin portions 71 and 73 shown in FIG. 10. Accordingly, shoulders 214 and 219 are threaded on from the shank sides, not from the side of the pin portions.

Shoulder 214 is threaded on over shank 212 and threaded on until firm stop 215 is encountered. Likewise, shoulder 219 is threaded on from below until firm stop 220 is encountered. Likewise, shoulder 222, lying below spacer washer 226 is threaded on until firm stop 224 is encountered. Pin 228, like pin 216, is integrally formed and lacks an abutting junction such as abutting junction 72.

Figure 24:
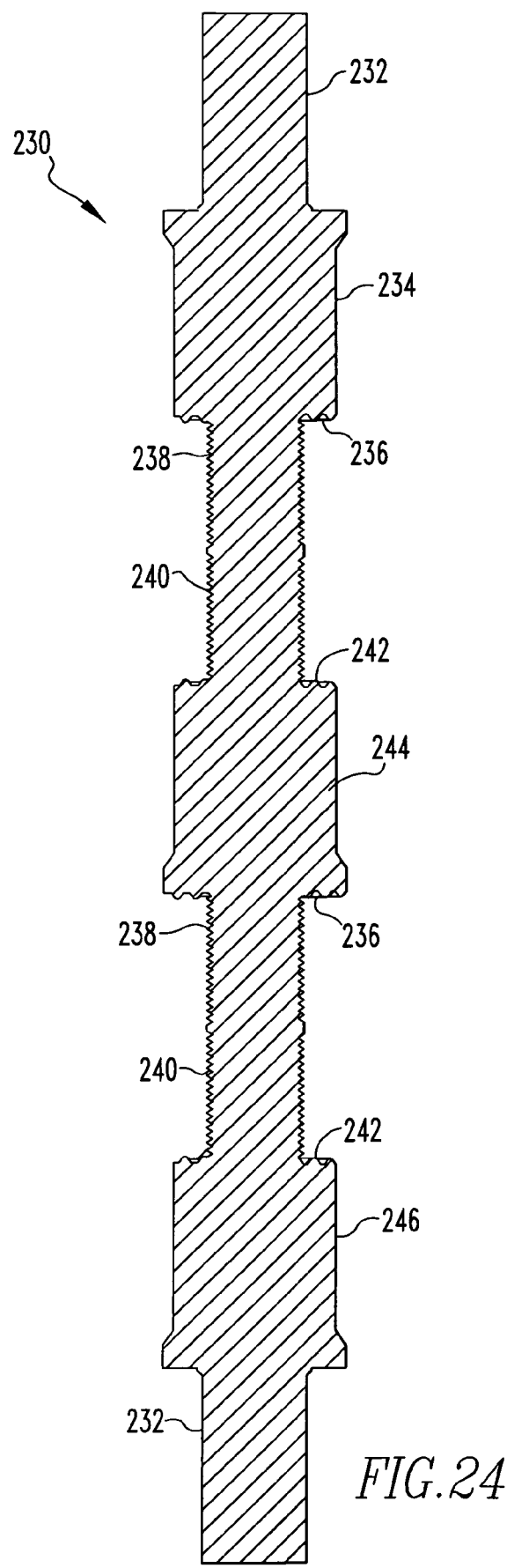
FIG. 24 is a median section of a multi-shouldered fixed bobbin tool that is integrally formed.

FIG. 24 illustrates an embodiment of the present invention which is integrally formed. FSW tool 230 is for making two FSW welds simultaneously. FSW tool 230 includes upper and lower shanks 232 to be held in chucks or collets of a FSW machine. Upper shoulder has working face 236 which is adjacent upper pin portion 238. Lower pin portion 240 is adjacent working face 242 of shoulder 244. Shoulder 244 also has a lower working face 236. Below the lower working face 236 of shoulder 244 is an upper pin portion 238, which lies above a lower pin portion 240. Lower shoulder 246 has a working face 242 adjacent lower pin portion 240.

Pin portions 238 and 240, preferably, have opposed threads so that when FSW tool 230 is rotated in an appropriate direction, pin portions 238 and 240 urge material toward the centers of the plates being welded. Likewise when tool 230 is rotated in that direction, threads on working faces 236 and 242 urge material inwardly toward the pin portions 238 and 240, respectively.

Although presently preferred and various alternative embodiments of the present invention have been described in considerable detail above with particular reference to the figures, it should be understood that various additional modifications and/or adaptations of the present invention can be made or envisioned by those persons skilled in the relevant art without departing from either the spirit of the instant invention or the scope of the appended claims.

We claim:

1. A friction stir welding tool for simultaneously making a plurality of parallel welds, said friction stir welding tool comprising:
    a plurality of friction stir welding modules, each of said friction stir welding modules comprising;
    at least one friction stir welding pin;
    a pair of workpiece engaging surfaces facing said at least one friction stir welding pin;
    each of said workpiece engaging surfaces being disposed on a shoulder attached to or integral with said at least one friction stir welding pin, whereby said shoulders and pin(s) rotate in unison;
    said friction stir welding modules being directly connected to each other whereby said modules rotate in unison;
    at least one shank attached to or integral with at least one of said friction stir welding modules, whereby said shank and said modules rotate in unison;
    said at least one shank for engagement with a chuck or collet of a friction stir welding machine to be rotated thereby.

2. A friction stir welding tool according to claim 1 wherein said at least one shank for engagement with a chuck or collect of a friction stir welding machine is two shanks disposed at opposite ends of said friction stir welding tool, said two shanks being for engagement with two coaxial chucks or collets of a friction stir welding machine that includes two coaxial chucks or collets.

3. A friction stir welding tool according to claim 1 wherein said at least one shank is integral with at least one of said at least one pin to form a shank-pin ensemble.

4. A friction stir welding tool according to claim 3 wherein at least one of said shoulders is threaded onto said shank-pin ensemble.

5. A friction stir welding tool according to claim 4 wherein said at least one of said shoulders includes a firm stop to be firmly engaged to said shank-pin ensemble.

6. A friction stir welding tool according to claim 1 further comprising:
an axial tension rod disposed within said friction stir welding tool;
means for placing said axial tension rod in tension whereby said at least one pin is placed in compression to prevent fracture of said at least one pin.

7. A friction stir welding tool according to claim 6 wherein said pin is comprised of a hard, high-temperature metal or a ceramic.

8. A friction slir welding tool according to claim 6 wherein said axial tension rod is placed in tension by at least one nut, said at least one nut engaging a threaded portion of said axial tension rod.

9. A friction stir welding tool according to claim 8 further comprising at least one spring washer compressed by said at least one nut whereby tension is maintained in said axial tension rod even when said axial tension rod is subjected to heat due to the friction stir welding process.

10. A friction stir welding tool according to claim 8 wherein said axial tension rod is threaded and at least one of said pins or at least one of said shoulders is threaded onto said tension rod whereby torsion may be communicated along said friction stir welding tool.

11. A friction stir welding tool according to claim 8 wherein at least one of said pins comprises a pair of pin portions, said pin portions having abutting ends.

12. A friction stir welding tool according to claim 11 wherein said abutting ends of said pin portions are non-axisymmetric whereby torsion may be communicated between said pin portions.

13. A friction stir welding tool according to claim 8 wherein at least one of said friction stir welding modules comprises two lesser modules, each lesser module comprising an integral shank-pin ensemble and a shoulder threaded onto said shank-pin ensemble.

14. A friction stir welding tool according to claim 13 wherein at least one of said shoulders includes a firm stop to be firmly engaged to a firm stop on said integral shank-pin ensemble.

15. A friction stir welding tool according to claim 13 wherein said shoulder may be assembled from a pin end of said integral shank-pin ensemble.

16. A friction stir welding tool according to claim 13 wherein said shoulder may be assembled from a shank end of said integral shank-pin ensemble.

17. A method of making a plurality of friction stir welds simultaneously to join a pair of workpieces, said method comprising:
placing said workpieces in juxtaposition;
moving said workpicces through a FSW machine, said FSW machine having a FSW tool having a plurality of directly connected welding modules;
whereby said plurality of FSW welds are produced by said FSW tool.

18. A method according to claim 17 wherein said workpieces are moved by a plurality of grippers attached to a plurality of belts.

19. A method according to claim 17 further comprising employing a loading conveyor to support said workpieces as they enter said FSW machine.

20. A method according to claim 17 further comprising employing an unloading conveyor to support said workpieces as they exit said FSW machine.

21. A friction stir welding tool for simultaneously making a plurality of parallel welds, said friction stir welding tool comprising:
a plurality of friction stir welding modules, each of said friction stir welding modules comprising:
at least one friction stir welding pin;
a pair of workpiece engaging surfaces facing said at least one friction stir welding pin;
each of said workpiece engaging surfaces being disposed on a shoulder attached to or integral with said at least one friction stir welding pin, whereby said shoulders and pin(s) rotate in unison;
said friction stir welding modules being integrally formed whereby said modules rotate in unison;
at least one shank attached to or integral with at least one of said friction stir welding modules, whereby said shank and said modules rotate in unison;
said at least one shank for engagement with a chuck or collet of a friction stir welding machine to be rotated thereby.

* * * * *

UNITED STATES PATENT AND TRADEMARK OFFICE
CERTIFICATE OF CORRECTION

PATENT NO. : 7,198,189 B2 Page 1 of 1
APPLICATION NO. : 11/235584
DATED : April 3, 2007
INVENTOR(S) : Stol et al.

It is certified that error appears in the above-identified patent and that said Letters Patent is hereby corrected as shown below:

(Col. 10, Line 40), "workpicce" should be --workpiece--; and (Col. 10, Line 57) "collect" should be --collet--

Signed and Sealed this

Third Day of July, 2007

JON W. DUDAS
*Director of the United States Patent and Trademark Office*

UNITED STATES PATENT AND TRADEMARK OFFICE
CERTIFICATE OF CORRECTION

| | | |
|---|---|---|
| PATENT NO. | : 7,198,189 B2 | Page 1 of 1 |
| APPLICATION NO. | : 11/235584 | |
| DATED | : April 3, 2007 | |
| INVENTOR(S) | : Israel Stol and John W. Cobes | |

It is certified that error appears in the above-identified patent and that said Letters Patent is hereby corrected as shown below:

In column 1, line 34, after "is", delete "affected" and insert --effected--.

Figure 6:
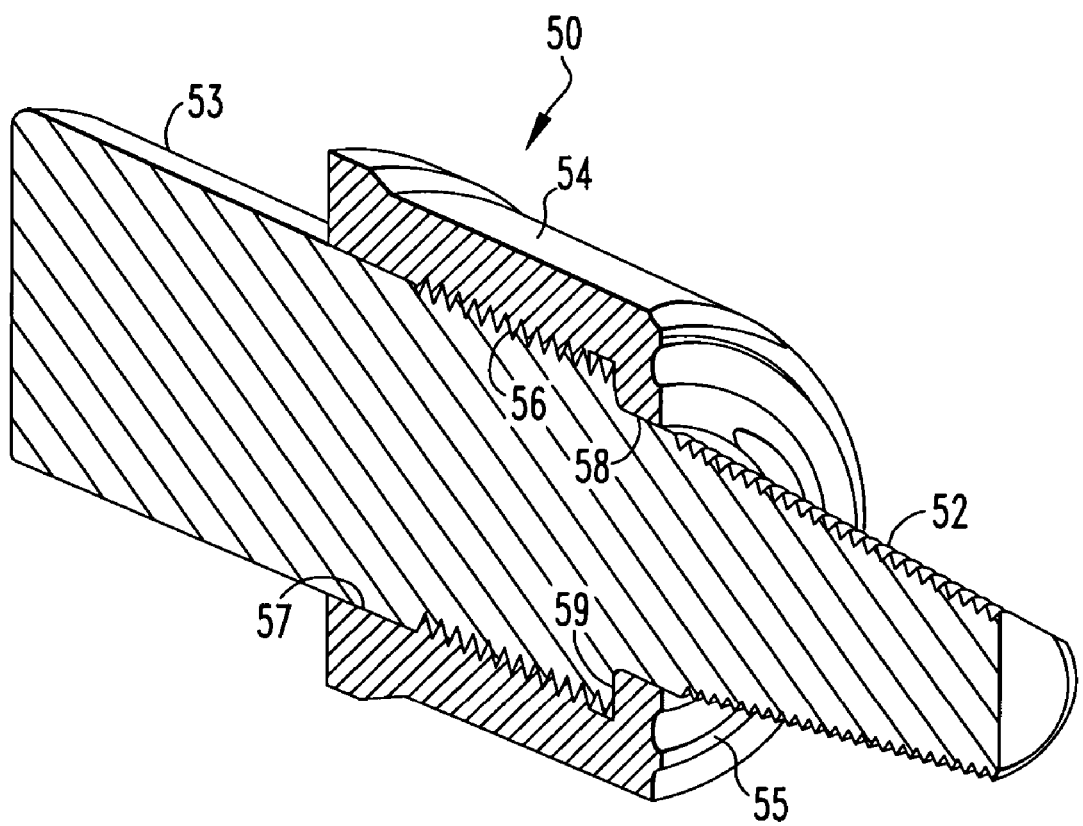
FIG. 6 is an illustration of a prior art bobbin type friction stir welding tool readied for welding one of a pair of parallel joints.
Figure 7:
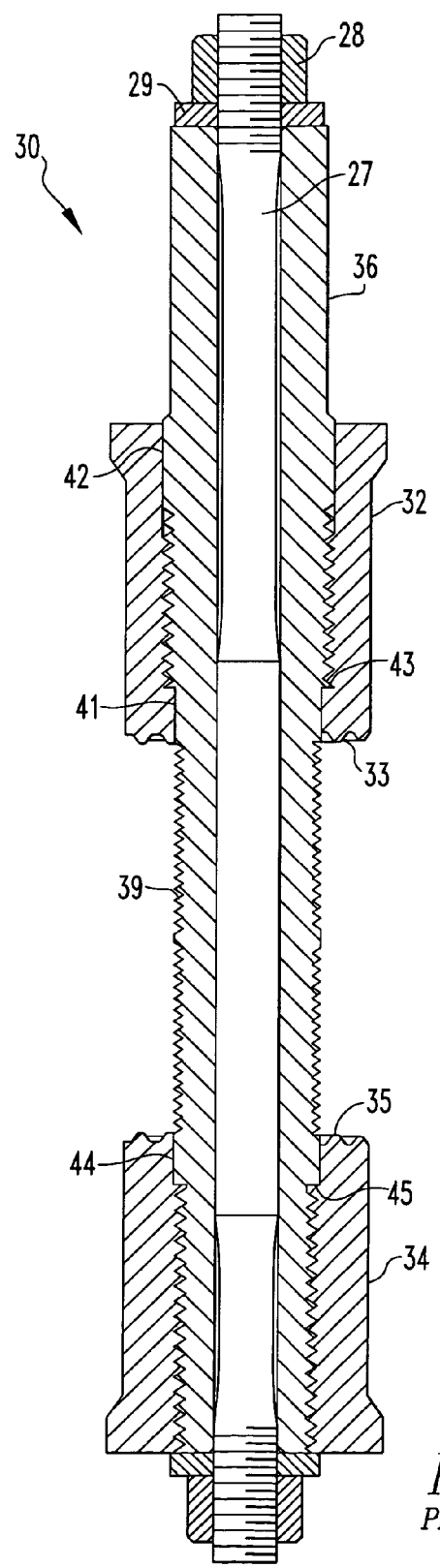
FIG. 7 is a sectional drawing of a bobbin type friction stir welding tool having an integral pin-shank and a pair of shoulders that self lock to the pin-shank and also having an internal tension member which places the pin in compression.

In column 3, lines 57-59, delete entire paragraph beginning with "FIG. 6" and insert --FIG. 6 is a sectional drawing of a friction stir welding tool having an integral pin-shank ensemble, and a self-locking shoulder threaded onto the integral pin-shank ensemble;--.

In column 7, lines 15-16, after "firmly", remove "lightening" and insert --tightening--.

In column 9, line 46, after "a", delete "complimentary" and insert --complementary--.

In column 11, line 14, line 1 of Claim 8, after "friction", delete "slir" and insert --stir--.

In column 12, line 8, line 5 of claim 17, after "said", delete "workpicces" and insert --workpieces--.

Signed and Sealed this

Third Day of March, 2009

JOHN DOLL
*Acting Director of the United States Patent and Trademark Office*